United States Patent
Kadokura et al.

(10) Patent No.: US 12,173,773 B2
(45) Date of Patent: Dec. 24, 2024

(54) DAMPING FORCE ADJUSTABLE SHOCK ABSORBER

(71) Applicant: Hitachi Astemo, Ltd., Ibaraki (JP)

(72) Inventors: Kosuke Kadokura, Hitachinaka (JP); Mikio Yamashita, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 405 days.

(21) Appl. No.: 17/615,943

(22) PCT Filed: May 26, 2020

(86) PCT No.: PCT/JP2020/020751
§ 371 (c)(1),
(2) Date: Dec. 2, 2021

(87) PCT Pub. No.: WO2020/246316
PCT Pub. Date: Dec. 10, 2020

(65) Prior Publication Data
US 2022/0316548 A1    Oct. 6, 2022

(30) Foreign Application Priority Data
Jun. 5, 2019   (JP) ................................. 2019-105461

(51) Int. Cl.
*F16F 9/512*    (2006.01)
*F16F 9/18*     (2006.01)

(52) U.S. Cl.
CPC .............. *F16F 9/512* (2013.01); *F16F 9/185* (2013.01); *F16F 2222/123* (2013.01)

(58) Field of Classification Search
CPC .......... F16F 9/512; F16F 9/5126; F16F 9/348; F16F 9/32; F16F 9/185; F16F 2222/123; B60G 2400/202; B60G 2500/11
See application file for complete search history.

(56) References Cited

U.S. PATENT DOCUMENTS

2012/0247889 A1   10/2012   Yabe et al.
2015/0198214 A1    7/2015   Mizuno

FOREIGN PATENT DOCUMENTS

JP   2012-215220   11/2012
JP   2015-132313    7/2015
(Continued)

OTHER PUBLICATIONS

International Search Report issued Aug. 25, 2020 in International Application No. PCT/JP2020/020751, with English translation.
(Continued)

*Primary Examiner* — Robert A. Siconolfi
*Assistant Examiner* — Mahbubur Rashid
(74) *Attorney, Agent, or Firm* — Wenderoth, Lind & Ponack, L.L.P.

(57) ABSTRACT

A damping force adjustable shock absorber including a compression-side ultra low speed valve that allows passage of an oil liquid from a lower cylinder chamber to an upper cylinder chamber. The compression-side ultra low speed valve is provided in a third passage and arranged in parallel to an extension-side ultra low speed valve. Thus, when a piston is performing a compression stroke and a piston speed falls within an ultra low speed range, oil liquid in the upper cylinder chamber can be expanded, resulting in a differential pressure between the upper cylinder chamber side and the lower cylinder chamber side of the compression-side ultra low speed valve (fifth low speed valve). As a result, when the piston speed falls within the ultra low speed range, the compression-side ultra low speed valve is opened, enabling generation of a damping force having a valve characteristic achieved by the ultra low speed valve.

10 Claims, 10 Drawing Sheets

(56) References Cited

FOREIGN PATENT DOCUMENTS

JP 6465983 B2 * 2/2019
WO WO 2018163868 A1 * 11/2019

OTHER PUBLICATIONS

International Preliminary Report on Patentability issued Dec. 16, 2021 in International Application No. PCT/JP2020/020751, with English translation.

* cited by examiner

DAMPING FORCE ADJUSTABLE SHOCK ABSORBER

TECHNICAL FIELD

The present invention relates to a damping force adjustable shock absorber that adjusts a damping force by controlling a flow of a working fluid caused along with a stroke of a piston rod.

BACKGROUND ART

In Patent Literature 1, there is disclosed a shock absorber including an ultra low speed valve. The ultra low speed valve is opened when a piston speed falls within an ultra low speed range corresponding to an extremely initial period in which the shock absorber starts operating. Further, in Patent Literature 2, there is disclosed a damping force adjustable shock absorber of a so-called control-valve side-mounting type. In the damping force adjustable shock absorber of the control-valve side-mounting type, a damping force generating mechanism including a solenoid is horizontally mounted to a side wall of an outer cylinder.

The damping force adjustable shock absorber described in Patent Literature 2 includes a lower cylinder chamber that always communicates with a reservoir via an orifice of a base valve. Further, the damping force adjustable shock absorber includes a pilot valve (control valve). When a damping force falls within a soft characteristic range, the pilot valve is opened. An upper cylinder chamber always communicates with the reservoir via an introduction orifice. Thus, when the ultra low speed valve described in Patent Literature 1 is directly used in a piston of the damping force adjustable shock absorber described in Patent Literature 2, it takes long time to generate a differential pressure that is required to open the ultra low speed valve. Thus, the damping force cannot be adjusted when the piston speed falls within the ultra low speed range.

CITATION LIST

Patent Literature

PTL 1: JP 2015-132313 A
PTL 2: JP 2012-215220 A

SUMMARY OF INVENTION

Technical Problem

The present invention has an object to provide a damping force adjustable shock absorber capable of adjusting a damping force when a piston speed falls within an ultra low speed range.

According to one embodiment of the present invention, there is provided a damping force adjustable shock absorber, including: a cylinder sealingly enclosing a working liquid; a reservoir sealingly enclosing the working liquid and a gas; a piston, which is slidably fitted into the cylinder, and separates a space inside the cylinder into a first chamber and a second chamber; a piston rod having one end coupled to the piston and another end extending to an outside through the first chamber; a base valve separating the second chamber and the reservoir from each other; a first low speed valve, which is provided in the piston, and is configured to allow a flow of the working liquid from the second chamber toward the first chamber; a second low speed valve, which is included in the base valve, and is configured to allow a flow of the working liquid from the reservoir toward the second chamber; a first passage connecting the first chamber and the reservoir to each other; a damping force adjustment mechanism capable of adjusting a damping force from a soft characteristic corresponding to a low damping force to a hard characteristic corresponding to a high damping force in accordance with an external command by controlling a flow of the working liquid in the first passage; a second passage connecting the reservoir and the second chamber; a third passage arranged in parallel or in series to the first low speed valve; and a third low speed valve, which is provided in the third passage, and is configured to allow a flow of the working liquid from the first chamber to the second chamber, the third low speed valve being opened at a pressure lower than a pressure at which the first low speed valve is opened, wherein the damping force adjustment mechanism includes: a main valve to be opened under a pressure of the working liquid; a pilot chamber configured to exert an internal pressure on the main valve in a valve-closing direction; an introduction orifice configured to introduce the working liquid into the pilot chamber; a pilot passage configured to allow communication between a downstream side of the introduction orifice and the pilot chamber and a downstream side of the main valve; and a control valve provided in the pilot passage, wherein the control valve and/or a fourth low speed valve, which is configured to allow a flow of the working liquid from the first chamber to the reservoir, is provided in the first passage, and wherein the fourth low speed valve is opened when a piston speed reaches a piston speed different from a piston speed at a time when the third low speed valve is opened.

According to one embodiment of the present invention, it is possible to provide a damping force adjustable shock absorber capable of adjusting a damping force when a piston speed falls within an ultra low speed range.

DESCRIPTION OF EMBODIMENTS (First Embodiment) A first embodiment of the present invention is described with reference to the accompanying drawings. For convenience of description, a vertical direction in FIG. 1 is directly used as "vertical direction" in the specification.

Figure 1:
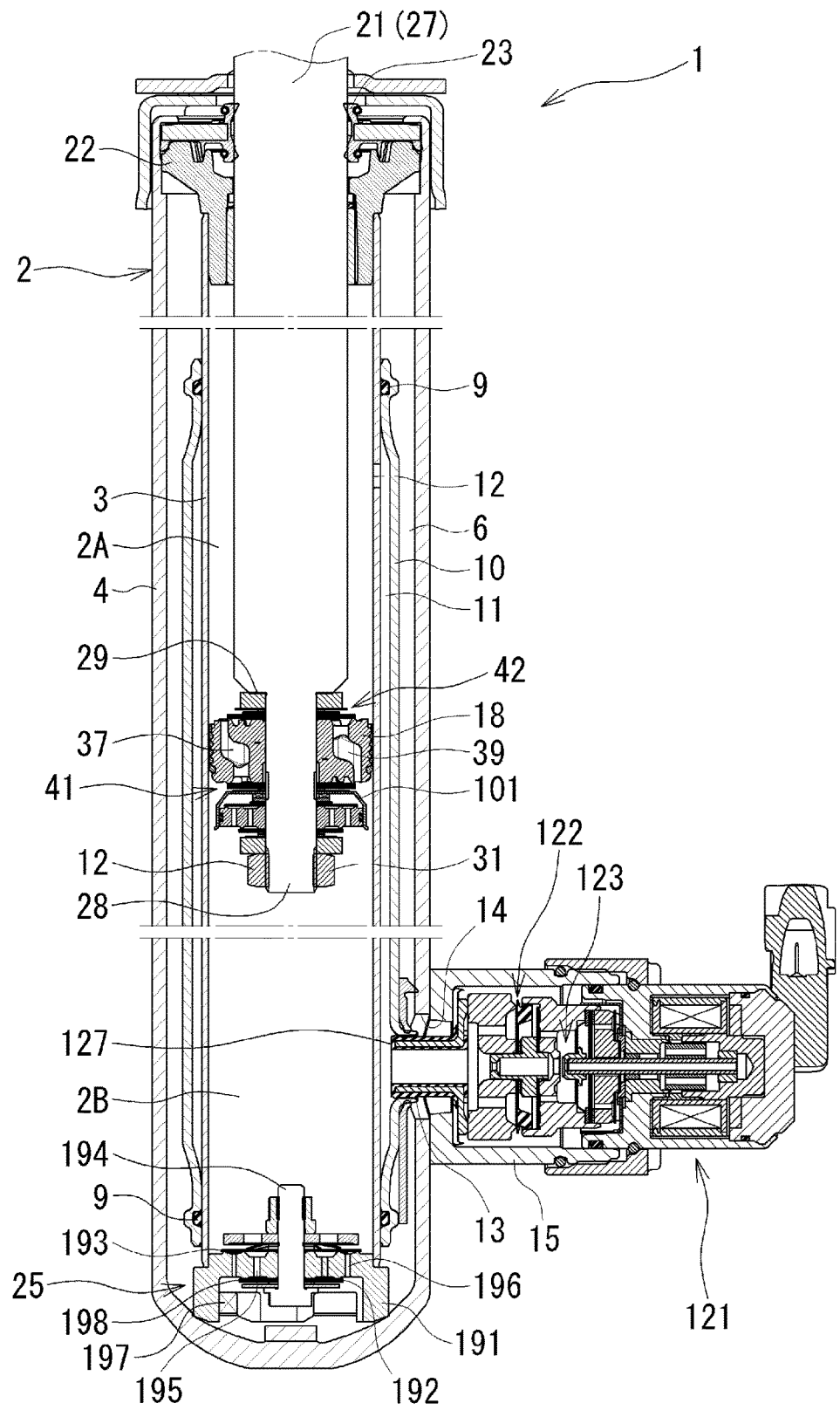
FIG. 1 is a sectional view of a damping force adjustable shock absorber according to a first embodiment.

As illustrated in FIG. 1, a damping force adjustable shock absorber 1 according to a first embodiment is a damping force adjustable shock absorber of a so-called control-valve side-mounting type in which a damping force adjustment mechanism 121 is horizontally mounted to a cylinder 2. The cylinder 2 includes an inner cylinder 3 and an outer cylinder 4. The outer cylinder 4 is arranged coaxially with the inner cylinder. A reservoir 6 is defined between the inner cylinder 3 and the outer cylinder 4. An oil liquid (working liquid or hydraulic fluid) is sealingly enclosed in the inner cylinder 3, and the oil liquid and a gas are sealingly enclosed in the reservoir 6.

A piston 18, which partitions a space inside the inner cylinder 3 into an upper cylinder chamber 2A (first chamber) and a lower cylinder chamber 2B (second chamber), is slidably fitted into the inner cylinder 3 of the cylinder 2. A lower end (one end) of a piston rod 21 is coupled to the piston 18. An upper end (another end) of the piston rod 21 passes through the upper cylinder chamber 2A, is inserted into a rod guide 22 and a sealing member 23 that are mounted to an upper end of the cylinder 2, and extends to an outside of the cylinder 2. The piston rod 21 includes a main shaft portion 27 and a mounting shaft portion 28. The main shaft portion 27 is guided by the rod guide 22. The piston 18 is mounted to the mounting shaft portion 28. A step portion 29 is formed between the main shaft portion 27 and the mounting shaft portion 28. The mounting shaft portion 28 has a threaded portion 31 formed at its lower end.

Figure 2:
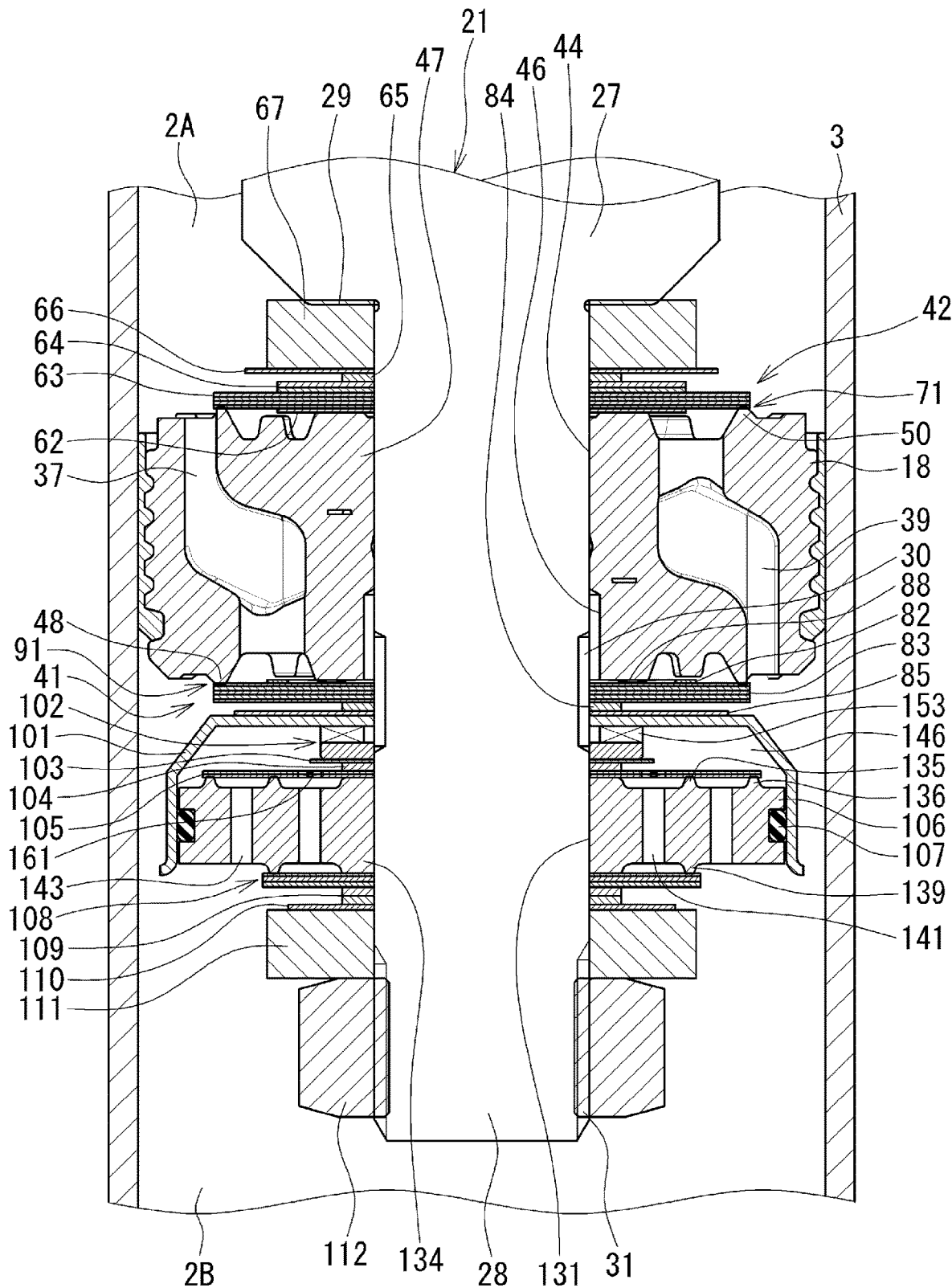
FIG. 2 is an enlarged view of an area around a piston in FIG. 1.

As illustrated in FIG. 2, passages 37 and 39 that allow communication between the upper cylinder chamber 2A and the lower cylinder chamber 2B are defined in the piston 18. The passage 37 (extension-side passage) has an open end on the upper cylinder chamber 2A side, which is located on a radially outer side of the piston 18, and an open end on the lower cylinder chamber 2B side, which is located on the radially inner side of the piston 18. Meanwhile, the passage 39 (compression-side passage) has an open end on the lower cylinder chamber 2B side, which is located on the radially outer side of the piston 18, and an open end on the upper cylinder chamber 2A side, which is located on a radially inner side of the piston 18.

An extension-side first damping force generating mechanism 41 is provided on a side of the passage 37 (extension-side passage), which is closer to the lower cylinder chamber 2B. The extension-side first damping force generating mechanism 41 generates a damping force by controlling a flow of the oil liquid from the upper cylinder chamber 2A via the passage 37 into the lower cylinder chamber 2B. Meanwhile, a compression-side first damping force generating mechanism 42 is provided on a side of the passage 39 (compression-side passage), which is closer to the upper cylinder chamber 2A. The compression-side first damping force generating mechanism 42 generates a damping force by controlling a flow of the oil liquid flowing from the lower cylinder chamber 2B via the passage 39 into the upper cylinder chamber 2A.

The compression-side first damping force generating mechanism 42 includes a seat portion 50 having an annular shape. The seat portion 50 is formed on a radially outer region of an end surface of the piston 18, which is on a side closer to the upper cylinder chamber 2A of the piston 18. A retainer 62, a disc valve 63, a plurality of retainers 64, a spacer 65, a retainer 66, and an annular member 67 are provided in the stated order from the piston 18 side between a clamp portion 47 of the piston 18 and the step portion 29 of the piston rod 21. The disc valve 63 includes a plurality of discs. These are included in the compression-side first damping force generating mechanism 42.

The compression-side first damping force generating mechanism 42 includes an intake valve 71 (first low speed valve) that allows a flow of the oil liquid from the lower cylinder chamber 2B (second chamber) via the passage 39 toward the upper cylinder chamber 2A (first chamber). The intake valve 71 includes the seat portion 50 having an annular shape and the disc valve 63. The disc valve 63 can be seated on and separated from the seat portion 50. The passage 39 is opened on the upper cylinder chamber 2A side toward a radially inner side of the seat portion 50. The disc valve 63 of the compression-side damping force generating mechanism 42 does not include a fixed orifice, which allows the lower cylinder chamber 2B and the upper cylinder chamber 2A to always communicate with each other.

The extension-side first damping force generating mechanism 41 includes a seat portion 48 having an annular shape. The seat portion 48 is formed on a radially outer region of an end surface of the piston 18, which is on a side closer to the lower cylinder chamber 2B of the piston 18. A retainer 82, a disc valve 83, a spacer 84, and a retainer 85 are provided in the stated order from the piston 18 side between a clamp portion 47 of the piston 18 and a cap 101 to be described later. The disc valve 83 includes a plurality of discs. These members are included in the extension-side first damping force generating mechanism 41.

The extension-side first damping force generating mechanism 41 includes a main valve 91 that allows a flow of the oil liquid from the upper cylinder chamber 2A (first chamber) via the passage 37 toward the lower cylinder chamber 2B (second chamber). The main valve 91 includes the seat portion 48 having an annular shape and the disc valve 83. The disc valve 83 can be seated on and separated from the seat portion 48. The retainer 82 has an orifice 88 (cutout). The orifice 88 allows the passage 37 to always communicate with a passage 30 defined in the mounting shaft portion 28 of the piston rod 21 via an annular passage 46. The annular passage 46 is defined between a large-diameter portion of an insertion hole 44 (shaft hole) of the piston 18 and the mounting shaft portion 28. The passage 30 is defined by forming two flat surfaces on the mounting shaft portion 28. The main valve 91 of the extension-side damping force generating mechanism 41 does not include a fixed orifice, which allows the passage 37 and the lower cylinder chamber 2B to always communicate with each other.

The cap 101 mentioned above, a passage member 102, a retainer 103, a spacer 104, a compression-side ultra low speed valve 105 (fifth low speed valve), and a valve body 106 are provided on a side of the extension-side first damping force generating mechanism 41, which is opposite to the piston 18 with respect to the main valve 91, and are arranged in the stated order from a side closer to the main valve 91. The compression-side ultra low speed valve 105 includes a plurality of discs. The cap 101 is formed in a substantially bottomed cylindrical shape being open on a side opposite to the piston 18. A space between an inner peripheral surface of the cap 101 and the valve body 106 is sealed with a sealing member 107 having an annular shape.

An extension-side ultra low speed valve 108 (third low speed valve), a plurality of spacers 109, a retainer 110, and an annular member 111 are provided on a side of the extension-side first damping force generating mechanism 41, which is opposite to the compression-side ultra low speed valve 105 through the valve body 106, and are arranged in the stated order from the side closer to the ultra low speed valve 105. The extension-side ultra low speed valve 108 includes a plurality of discs. Components located between the annular members 67 and 111, through which the mounting shaft 28 passes, are fixed with a nut 112 fastened onto the threaded portion 31 of the mounting shaft 28.

The valve body 106 has a clamp portion 134 with a shaft hole 131. The valve body 106 has a seat portion 136 having an annular shape. The seat portion 136 is formed on a radially outer region of an end surface of the valve body 106, which is on a side closer to the piston 18. An outer peripheral edge portion of the compression-side ultra low speed valve 105 can be seated on and separated from the seat portion 136. The valve body 106 has a seat portion 135 having an annular shape. The seat portion 135 is formed on the end surface of the valve body 106, which is on the side closer to the piston 18, and is located between the clamp portion 134 and the seat portion 136. An intermediate portion of the compression-side ultra low speed valve 105 can be seated on and separated from the seat portion 135. Meanwhile, the valve body 106 has a seat portion 139 having an annular shape. The seat portion 139 is formed on an end surface of the valve body 106, which is on a side opposite to the piston 18. An outer peripheral edge portion of the extension-side ultra low speed valve 108 can be seated on and separated from the seat portion 139.

The valve body 106 has passages 141 and 143 that pass through the valve body 106 in an axial direction (vertical direction) thereof. A plurality of the passages 141 are located on a radially inner side, and a plurality of the passages 143 are located on a radially outer side. Each of the passages 141 has an open end (lower end) on a side closer to the extension-side ultra low speed valve 108, which is located on a radially inner side of the seat portion 139, and an open end (upper end) on a side closer to the compression-side ultra low speed valve 105, which is located on a radially inner side of the seat portion 135. Meanwhile, each of the passages 143 has an open end (lower end) on the side closer to the extension-side ultra low speed valve 108, which is exposed to the lower cylinder chamber 2B, and an open end (upper end) on the side closer to the compression-side ultra low speed valve 105, which is located between the seat portions 135 and 136.

A cap chamber 146 is defined between the cap 101 and the valve body 106. The cap chamber 146 always communicates with the upper cylinder chamber 2A via a passage 153 defined in the passage member 102, the passage 30 defined in the mounting shaft portion 28, the annular passage 46 defined on the inner periphery side of the piston 18, the orifice 88 of the retainer 82, and the extension-side passage 37 defined in the piston 18. Further, the cap chamber 146 always communicates with the passages 141 in the valve body 106 via a passage 161 defined in the compression-side ultra low speed valve 105. The ultra low speed valve 105 functions as a check valve that allows a flow of the oil liquid from the lower cylinder chamber 2B to the cap chamber 146.

As illustrated in FIG. 1, a base valve 25 is provided on a bottom of the cylinder 2. The base valve 25 includes a valve body 191, an extension-side disc valve 192, a compression-side disc valve 193 (second low speed valve), and a mount pin 194. The valve body 191 separates the lower cylinder chamber 2B and the reservoir 6 from each other. The extension-side disc valve 192 is provided on a side (lower end side) of the valve body 191, which is closer to the reservoir 6. The compression-side disc valve 193 is provided on a side (upper end side) of the valve body 191, which is closer to the lower cylinder chamber 2B. The mount pin 194 mounts the extension-side disc valve 192 and the compression-side disc valve 193, which are suction valves, to the valve body 191.

The valve body 191 has passages 195 and 196 passing through the valve body 191 in an axial direction (vertical direction) thereof. A plurality of the passages 195 are located on a radially inner side, and a plurality of the passages 196 are located on a radially outer side. The extension-side disc valve 192 functions as a check valve configured to allow a flow of the oil liquid from the lower cylinder chamber 2B to the reservoir 6 via the plurality of passages 195. The extension-side disc valve 192 has an orifice 198 configured to allow the lower cylinder chamber 2B and the reservoir 6 to always communicate with each other. Meanwhile, the compression-side disc valve 193 functions as a suction valve configured to allow a flow of the oil liquid from the reservoir 6 to the lower cylinder chamber 2B via a plurality of the passages 196. The valve body 191 has a cutout 197 configured to allow a space below a lower end of the valve body 191 and the reservoir 6 to always communicate with each other.

As illustrated in FIG. 1, a separator tube 10 is mounted on an outer periphery of the inner cylinder 3 with a pair of sealing members 9, 9 interposed therebetween. An annular oil path 11 is defined between the separator tube 10 and the inner cylinder 3. The annular oil path 11 communicates with the upper cylinder chamber 2A via a plurality of passages 12 formed through an upper end part of a side wall of the inner cylinder 3. A connection port 13 (opening) having a cylindrical shape is formed through a lower end part of a side wall of the separator tube 10. The connection port 13 projects laterally, and has an open distal end. A mounting hole 14 is formed through a side wall of the outer cylinder 4 so as to be opposed to the connection port 13. The mounting hole 14 is located coaxially with the connection port 13, and has an inner diameter larger than an outer diameter of the connection port 13. A case 15 having a substantially cylindrical shape is provided on the side wall of the outer cylinder 4 so as to surround the mounting hole 14. The damping force adjustment mechanism 121 is accommodated in the case 15.

Figure 3:
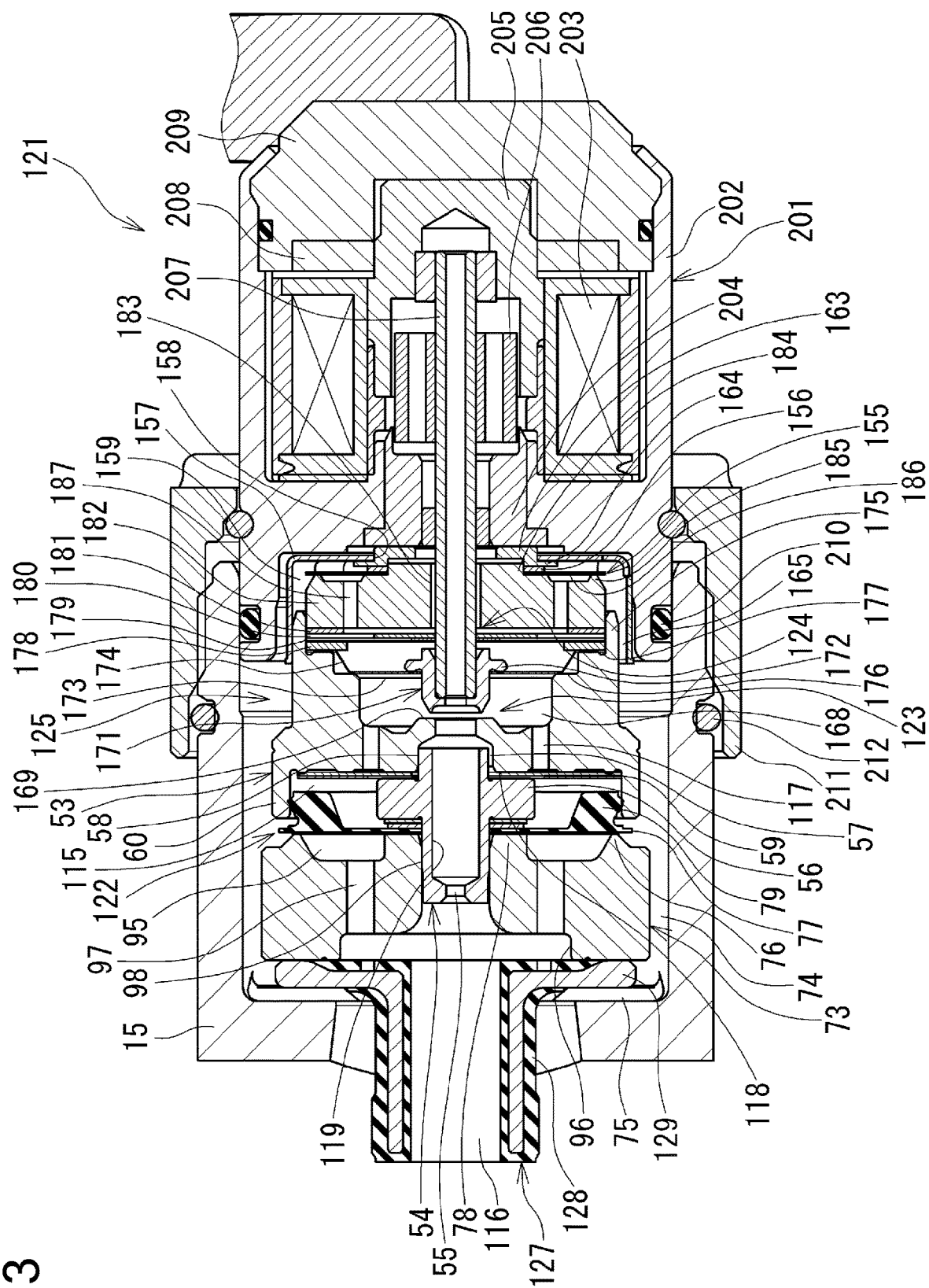
FIG. 3 is an enlarged view of a damping force adjustment mechanism in FIG. 1.

With reference to FIG. 3, the damping force adjustment mechanism 121 includes a valve block 125 and a solenoid block 201. A back-pressure main valve 122, a pilot valve 123 (control valve) configured to control a valve opening pressure of the main valve 122, and a fail-safe valve 124 provided on a downstream side of the pilot valve 123 are assembled and integrated to form the valve block 125. The solenoid block 201 includes a mechanism configured to actuate the pilot valve 123, which is incorporated therein.

A joint member 127 (passage member) is inserted into the case 15. The joint member 127 includes a tubular portion 128 and a flange portion 129 (abutment surface). The tubular portion 128 has a cylindrical shape, and has one distal end inserted into the connection port 13 (opening). The flange portion 129 is formed at another end of the tubular portion 128. The joint member 127 is covered with a sealing member. As a result, an abutment portion between the connection port 13 and a main body 73 is sealed. A bottom portion (inward flange portion) of the case 15 has a plurality of grooves configured to allow communication between a flow path 74 on an outer side of the valve block 125, specifically, the damping force adjustment mechanism 121, and the reservoir 6. The formation of the grooves defines a plurality of passages 75 configured to allow communication between the flow path 74 and the reservoir 6.

The valve block 125 includes the main body 73 having an annular shape, a pilot body 53 having an annular shape, and a pilot pin 54. The pilot pin 54 couples the main body 73 and the pilot body 53 to each other. One end surface (left end surface in FIG. 3) of the main body 73 is brought into abutment against the flange portion 129 (abutment surface) of the joint member 127. The main body 73 has a seat portion 76 having an annular shape formed on an outer peripheral end region of another end surface (right end surface in FIG. 3) thereof. An outer peripheral edge portion of a main disc valve 77 included in the main valve 122 is seated on the seat portion 76.

An inner peripheral edge portion of the main disc valve 77 is clamped between the pilot pin 54 and a clamp portion 78 of the main body 73. A packing 79 having an annular shape is rigidly fixed to an outer peripheral edge portion of a back surface (right-side surface in FIG. 3) of the main disc valve 77. The clamping portion 78 having an annular shape is formed on an inner peripheral edge portion of the main body 73. The main body 73 has an annular recessed portion formed on another end surface thereof. When the main disc valve 77 is seated on the seat portion 76, an annular passage 95 is defined. Meanwhile, the main body 73 has a recessed portion 96 formed in the one end surface. Further, the main body 73 has a plurality of passages 97 (main flow paths) that allows communication between the recessed portion 96 on the one end side and the annular passage 95 on another end side.

The pilot pin 54 is formed in a bottomed cylindrical shape, and has an introduction orifice 55 formed in its bottom portion. The pilot pin 54 has a large-diameter portion 56 at an intermediate portion in an axial direction thereof. The large-diameter portion 56 is used to clamp the main disc valve 77. One end (left end in FIG. 3) of the pilot pin 54 is press-fitted into a shaft hole 98 of the main body 73. Another end (right end in FIG. 3) of the pilot pin 54 is fitted into a shaft hole 58 of the pilot body 53. An outer peripheral surface of the another end of the pilot pin 54 has a plurality of grooves extending in an axial direction (horizontal direction in FIG. 2) thereof. When the another end of the pilot pin 54 is press-fitted into the shaft hole 58 of the pilot body 53, a plurality of passages 57 (introduction passages) are defined between the another end of the pilot pin 54 and the pilot body 53.

The pilot body 53 has a substantially bottomed cylindrical shape with open another end. A flexible disc 59 is provided on one end surface of the pilot body 53 in such a manner as to be clamped between the one end surface of the pilot body 53 and the large-diameter portion 56 of the pilot pin 54. The pilot body 53 has a cylindrical portion 60 formed on an outer peripheral edge portion of its one end, and the cylindrical portion 60 is coaxial with the pilot body 53. The packing 79 of the main valve 122 is slidably brought into abutment against an inner peripheral surface of the cylindrical portion 60. The abutment of the packing 79 against the cylindrical portion 60 defines a pilot chamber 115 on a back surface side of the main disc valve 77.

The pilot chamber 115 exerts an internal pressure on the main disc valve 77 (main valve 122) in a valve-closing direction. The main disc valve 77 is separated from the seat portion 76 under a pressure of the oil liquid that has been introduced from the annular oil path 11 via a flow path 116 defined inside the joint member 127, the recessed portion 96 of the main body 73, and the plurality of passages 97. In this manner, the main disc valve 77 is opened, and brings the passages 97 in the main body 73 into the flow path 74 on the outer side of the valve block 125.

The pilot body 53 has a plurality of passages 117 passing through its bottom portion in the axial direction. The pilot body 53 has a seat portion (reference symbol is omitted) having an annular shape on one end surface of its bottom portion. The flexible disc 59 is seated on the seat portion. When the flexible disc 59 is seated on the seat portion, an annular passage is defined between the flexible disc 59 and the one end surface of the bottom portion. The annular passage communicates with one end (left side in FIG. 3) of each of the passages 117. When being warped under the internal pressure of the pilot chamber 115, the flexible disc 59 provides volume elasticity to the pilot chamber 115.

Abutment of an outer peripheral edge portion of the flexible disc 59 with the inner peripheral surface of the cylindrical portion 60 of the pilot body 53 allows centering of the flexible disc 59. The flexible disc 59 is formed by laminating a plurality of discs. One of the plurality of discs that is in abutment against the large-diameter portion 56 of the pilot pin 54 has a cutout 118 (introduction passage) that communicates with the passages 57 defined between the pilot body 53 and the pilot pin 54. The oil liquid in the annular oil path 11 is introduced into the damping force adjustment mechanism 121 via the connection port 13 (opening) and the flow path 116 inside the joint member 127. Further, the oil liquid is introduced into the pilot chamber 115 via an introduction passage, that is, the introduction orifice 55, a shaft hole 119 in the pilot pin 54, the passages 57, and the cutout 118.

A valve chamber 168 is defined inside the pilot body 53. The pilot body 53 has a seat portion 169 (pilot valve) formed on its bottom portion so that the seat portion 169 is located around an outer peripheral edge of another end of the shaft hole 58. A valve body 171 (pilot valve) provided in the valve chamber 168 is seated on and separated from the seat portion 169. The valve body 171 is formed in a substantially cylindrical shape, and has one tapered end, which is seated on and separated from the seat portion 169. A spring receiving portion 172 having an outward flange shape is formed on another end side of the valve body 171.

The valve body 171 is provided so as to be opposed to the seat portion 169, and is elastically supported by a pilot spring 173, a fail-safe spring 174, and a fail-safe disc 179 so as to be movable in an axial direction (horizontal direction in FIG. 3) thereof. The pilot body 53 has a cylindrical portion 175 at another end thereof. The cylindrical portion 175 has step portions 176 and 177 so as to have an inner diameter that increases toward an opening in a stepwise manner. An outer peripheral edge portion of the pilot spring 173 is supported by the step portion 176. The fail-safe spring 174, a retainer 178, the fail-safe disc 179, a retainer 180, a spacer 181, and a washer 182 are stacked on one another and inserted into the cylindrical portion 175.

The washer 182 has a shaft hole 183 into which an operating rod 207 is inserted. The washer 182 has a mounting boss 184 formed in a center of its end surface on a side opposite to a valve chamber 168. The washer 182 has a seat portion 185 having an annular shape. The seat portion 185 is formed on an outer peripheral edge portion of the end surface of the washer 182, which is on the side opposite to the valve chamber 168. The washer 182 has an annular recessed portion 186. The annular recessed portion 186 is formed in an end surface of the washer 182, which is on the side opposite to the valve chamber 168, and is located between the mounting boss 184 and the seat portion 185. The washer 182 has a plurality of passages 187 that allow communication between the annular recessed portion 186 and the valve chamber 168.

An ultra low speed valve 155 (second low speed valve) is mounted in the mounting boss 184 of the washer 182, and has an outer peripheral edge portion that is in abutment against the seat portion 185 so as to be seatable thereon and separable therefrom. An inner peripheral edge portion of the ultra low speed valve 155, a spacer 156, and a cap holder 163 are located in the stated order from the washer 182 side between an outer peripheral edge portion of a base of the mounting boss 184 of the washer 182 and a core 204 described later. This structure allows the inner peripheral edge portion of the ultra low speed valve 155 to be clamped.

A cylindrical portion of a cap 157 having a substantially bottomed cylindrical shape is fitted over an outer periphery of the cylindrical portion 175 of the pilot body 53. The cap holder 163 is fitted into a shaft hole 158 in a bottom portion of the cap 157. As a result, a cap chamber 159 is defined between the cap 157 and the washer 182. The ultra low speed valve 155 is provided in the cap chamber 159. The cap holder 163 has a shaft hole (reference symbol is omitted) and a flange portion 164. The operating rod 207 is inserted into the shaft hole. The flange portion 164 supports an outer peripheral edge portion of the shaft hole 158 of the cap 157. The passage 165 that allows the cap chamber 159 and a flow path 74 on an outer side of a valve block 125 to always communicate with each other is defined between the cap 157 and a pilot body 53.

A coil 203, cores 204 and 205, a plunger 206, and a hollow operating rod 207 coupled to the plunger 206 are assembled and integrated inside the solenoid case 202 to form the solenoid block 201. A spacer 208 and a cover 209 are inserted into another end of the solenoid case 202. The components inside the solenoid case 202 are fixed by caulking another end of the solenoid case 202. When the coil 203 is energized via a lead wire (not shown), the plunger 206 generates a thrust force in the axial direction in accordance with a current value.

One end of the solenoid case 202 is inserted into an opening at another end of the case 15. A space between the solenoid case 202 and the case 15 is sealed with a sealing member 210. One end of the operating rod 207 projects into the valve chamber 168. The valve body 171 is mounted to one end of the operating rod 207. When a nut 211 is tightened to compress a retaining ring 212 mounted in an annular groove, the solenoid case 202 is fixed to the case 15. As a result of fixing, the valve block 125 and the solenoid block 201 are coupled together.

When the coil 203 is not energized, the valve body 171 is urged in a seat-separating direction (rightward in FIG. 3) for the valve body 171 by a spring force of the fail-safe spring 174 to thereby bring the spring receiving portion 172 into abutment against (seating the spring receiving portion 172 on) the fail-safe disc 179. At this time, the pilot spring 173 is separated from the step portion 176. Meanwhile, when the coil 203 is energized, the operating rod 207 is urged in a seating direction (leftward in FIG. 3) for the valve body 171 to thereby bring the pilot spring 173 into abutment against the step portion 176. The valve body 171 is seated on the seat portion 169 of the pilot pin 54 against spring forces of the pilot spring 173 and the fail-safe spring 174. Then, when a value of the current for energizing the coil 203 is changed, a valve-opening pressure on the valve body 171 is controlled.

For convenience, a flow of the oil liquid in the damping force adjustment mechanism 121 is roughly classified into a main flow and a pilot flow. The main flow is a flow of the oil liquid passing through a main passage 225 (see FIG. 4). The main passage 225 brings the recessed portion 96 formed in the one end of the main body 73 and a downstream side of the main valve 122 into communication with each other. The main passage 225 includes the plurality of passages 97 of the main body 73 and the annular passage 95. The main passage 225 allows the oil liquid, which has been introduced from the connection port 13 (opening) into the annular passage 95 via the plurality of passages 97, to be discharged via the main valve 122 into the flow path 74 (outside of the passage member) communicating with the reservoir 6.

Meanwhile, the pilot flow is a flow of the oil liquid passing through a pilot passage 226 (see FIG. 4) including the introduction passage described above. When the pilot valve 123 is opened and a damping force has a soft characteristic, the pilot passage 226 allows the oil liquid, which has been introduced into the valve chamber 168 via the introduction orifice 55 from the connection port 13 (opening), to be discharged via the plurality of passages 187, the ultra low speed valve 144 (fourth low speed valve), the cap chamber 159, and the passage 165 into the flow path 74 (outside of the passage member) communicating with the reservoir 6. In the first embodiment, when the damping force has a soft characteristic, specifically, a value of the current for energizing the coil 203 is small, the spring force of the pilot spring 173 and the thrust force of the plunger 206 are balanced, separating the pilot valve 123 from the seat portion 169.

A hydraulic circuit of the damping force adjustable shock absorber 1 according to the first embodiment is described with reference to FIG. 4.

The piston 18 includes a passage 220 that connects the upper cylinder chamber 2A and the lower cylinder chamber 2B to each other. The passage 220 includes the passage 39. The intake valve 71 (first low speed valve) that allows the flow of the oil liquid from the lower cylinder chamber 2B to the upper cylinder chamber 2A is provided in the passage 220. Further, the piston 18 includes a third passage 223 located in parallel with the intake valve 71.

The extension-side ultra low speed valve 108 (third low speed valve) that allows the flow of the oil liquid from the upper cylinder chamber 2A to the lower cylinder chamber 2B is provided in the third passage 223. The ultra low speed valve 108 is opened at a pressure lower than a pressure at which the intake valve 71 (first low speed valve) is opened. The compression-side ultra low speed valve 105 (fifth low speed valve) is provided in the third passage 223 so as to be located in parallel to the extension-side ultra low speed valve 108. Further, the orifice 88 is located in the third passage 223 so as to be closer to the upper cylinder chamber 2A with respect to the ultra low speed valves 108 and 105.

The third passage 223 includes an extension-side path and a compression-side path. The extension-side path passes through the extension-side passage 37 of the piston 18, the orifice 88 of the retainer 82, the annular passage 46 defined on the inner periphery side of the piston 18, the passage 30 defined in the mounting shaft portion 28, the passage 153 defined in the passage member 102, the cap chamber 146, the passage 161 defined in the compression-side ultra low speed valve 105, the passages 141 of the valve body 106, and the extension-side ultra low speed valve 108 (third low speed valve). The compression-side path passes through the passages 143 of the valve body 106, the compression-side ultra low valve 105 (fifth low speed valve), the cap chamber 146, the passage 153 defined in the passage member 102, the passage 30 defined in the mounting shaft portion 28, the annular passage 46 defined on the inner periphery side of the piston 18, the orifice 88 of the retainer 82, and the extension-side passage 37 defined in the piston 18.

The lower cylinder chamber 2B and the reservoir 6 are connected to each other through a second passage 222. The second passage 222 includes the passages 195 and 196 defined in the base valve 25 and the cutout 197. The compression-side disc valve 193 (second low speed valve) is provided in the second passage 222 (base valve 25). The orifice 198 is provided in the second passage 222 (extension-side disc valve 192) so as to be arranged in parallel to the compression-side disc valve 193.

The upper cylinder chamber 2A (first chamber) and the reservoir 6 are connected to each other through a first passage 221. The first passage 221 includes the main passage 225, the pilot passage 226, and a communication path 227, which are defined in the damping force adjustment mechanism 121. The communication path 227 allows communication between the main valve 122 and the pilot passage 226. The communication path 227 includes the valve chamber 168 of the pilot body 53, the passages 117, the flexible disc 59, and the pilot chamber 115.

The main valve 122 of the damping force adjustment mechanism 121 is provided in the main passage 225. The introduction orifice 55 is provided in the introduction passage 226. The introduction orifice 55 is arranged on a side closer to the upper cylinder chamber 2A with respect to a connecting portion 228 between the pilot passage 226 and the communication path 227. The pilot valve 123 is arranged on a side closer to the reservoir 6 with respect to the connecting portion 228. Further, the ultra low speed valve 155 (fourth low speed valve) that allows the flow of the oil liquid from the upper cylinder chamber 2A (first chamber) to the reservoir 6 is provided in the pilot passage 226. The ultra low speed valve 155 is arranged on a side closer to the reservoir 6 with respect to the pilot valve 123.

A piston speed at which the extension-side ultra low speed valve 108 (third low speed valve) included in the piston 18 is opened is lower than a piston speed at which the ultra low speed valve 155 (fourth low speed valve) provided in the pilot passage 226 is opened. Further, a piston speed at which the compression-side ultra low speed valve 105 (fifth low speed valve) provided in the piston 18 is opened is lower than a piston speed at which the ultra low speed valve 155 (fourth low speed valve) provided in the pilot passage 226 is opened. In addition, a piston speed at which the compression-side ultra low speed valve 105 is opened is lower than a piston speed at which the intake valve 71 (first low speed valve) provided in the piston 18 is opened.

Figure 5:
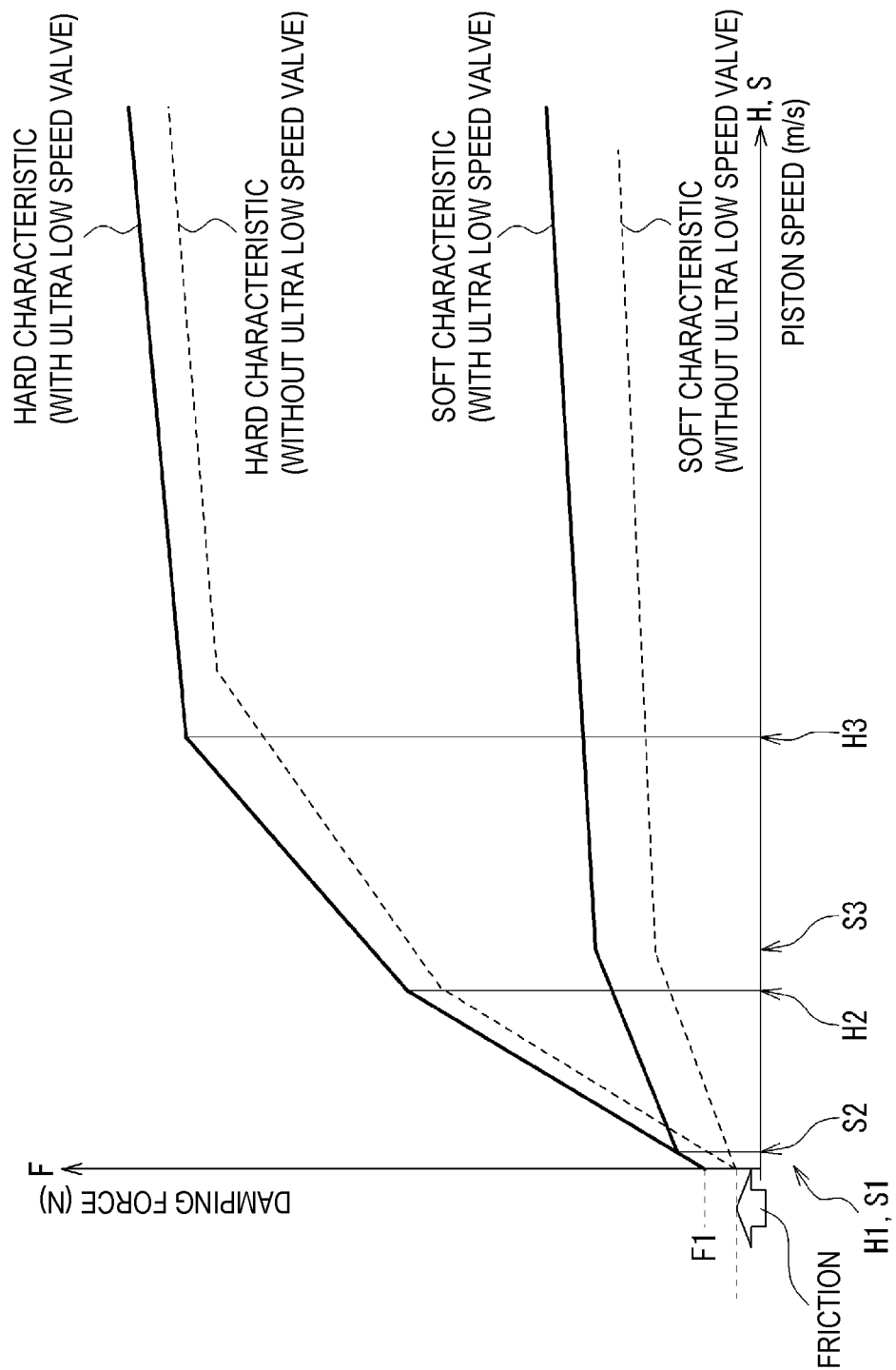
FIG. 5 is a graph for showing damping force characteristics of the damping force adjustable shock absorber according to the first embodiment when a piston is performing a compression stroke.

FIG. 5 is a graph for showing damping force characteristics when the damping force adjustable shock absorber 1 according to the first embodiment when the piston is performing a compression stroke.

(Hard Mode)

When the damping force adjustable shock absorber operates in a hard mode in which a damping force having a hard characteristic is generated and the piston speed falls within a friction region in which the piston speed ranges from 0 to H1 (for example, 0.002 m/s), a damping force F1 (axial force) is generated with a friction force at a sliding portion. When the piston speed reaches H1 and the compression-side ultra low speed valve 105 (fifth low speed valve) of the piston 18 is opened, a damping force having a valve characteristic achieved by the ultra low speed valve 105 is generated in an initial period. After that, a damping force having an orifice characteristic is generated mainly by the orifice 88 of the piston 18 in a very low speed range up to H2 at which the pilot valve 123 (control valve) of the damping force adjustment mechanism 121 is opened. The damping force of the ultra low speed valve 105 when the piston speed falls within the very low speed range has a saturation characteristic. Further, when the piston speed falls within the very low speed range, the pilot valve 123 of the damping force adjustment mechanism 121 is in a valve-closed state.

When the piston speed falls within a low speed range starting from H2 (an opening point of the pilot passage 226) to H3 at which the main valve 122 of the damping force adjustment mechanism 121 is opened, the pilot valve 123 and the ultra low speed valve 155 (fourth low speed valve) are opened. The damping force is generated mainly by the introduction orifice 55 of the damping force adjustment mechanism 121. The damping force generated by the ultra low speed valve 155 when the piston speed falls within the low speed range has a saturation characteristic. Then, when the piston speed falls within an intermediate speed range, in which the piston speed is subsequent to H3, after the main valve 122 of the damping force adjustment mechanism 121 is opened, a damping force having a valve characteristic achieved by the main valve 122 is generated.

(Soft Mode)

When the damping force adjustable shock absorber 1 operates in the soft mode in which a damping force having a soft characteristic is generated and the piston speed falls within the friction region ranging from 0 to S1, a damping force F1 (axial force) is generated by the fiction force at the sliding portion. When the piston speed falls within an ultra low speed range from S1 to S2 at which the ultra low speed valve 155 (fourth low speed valve) of the damping force adjustment mechanism 121 is opened, a differential pressure is generated between the upper cylinder chamber 2A side and the lower cylinder chamber 2B (second chamber) side of the compression-side ultra low speed valve 105 (fifth low speed valve) due to expansion of the oil liquid in the upper cylinder chamber 2A (first chamber). As a result, the compression-side ultra low speed valve 105 is opened. Then, when the piston speed falls within the ultra low speed range from S1 to S2, the damping force having the valve characteristic achieved by the ultra low speed valve 105 is generated. When the piston speed falls within the ultra low speed range, the pilot valve 123 of the damping force adjustment mechanism 121 is in a valve-opened state.

When the piston speed falls within a very low speed range from the piston speed reaching S2 to S3 at which the main valve 122 of the damping force adjustment mechanism 121 is opened, the intake valve 71 (first low speed valve) is first opened. After that, a damping force having a valve characteristic achieved by the ultra low speed valve 155 (fourth low speed valve) of the damping force adjustment mechanism 121 is generated. Then, when an orifice differential pressure at the orifice 88 of the piston 18 increases to generate a pressure difference at the introduction orifice 55 of the damping force adjustment mechanism 121, the main valve 122 of the damping force adjustment mechanism 121 is opened. When the piston speed falls within a low speed range, in which the piston speed is subsequent to S3, after the main valve 122 of the damping force adjustment mechanism 121 is opened, a damping force having a valve characteristic achieved by the main valve 122 is generated. When the piston speed falls within an intermediate speed range, the intake valve 71 (first low speed valve) of the piston 18 is opened. As a result, a damping force having a valve characteristic achieved by the intake valve 71 is generated.

Meanwhile, when the damping force adjustable shock absorber 1 operates in the soft mode, the piston is performing an extension stroke, and the piston falls within the ultra low speed range, the oil liquid in the upper cylinder chamber 2A (first chamber) is compressed to generate a differential pressure between the upper cylinder chamber 2A side and the lower cylinder chamber 2B (second chamber) side of the extension-side ultra low speed valve 108 (third low speed valve). As a result, the ultra low speed valve 108 is opened. Thus, when the piston is performing the extension stroke and the piston speed falls within the ultra low speed range, a damping force having a valve characteristic achieved by the ultra low speed valve 108 is generated. Further, when the orifice differential pressure at the orifice 88 of the piston 18 increases to open the ultra low speed valve 155 (fourth low speed valve) of the damping force adjustment mechanism 121, the damping force having the valve characteristic achieved by the ultra low speed valve 155 is generated. After that, when the pressure difference at the introduction orifice 55 of the damping force adjustment mechanism 121 increases, the main valve 122 of the damping force adjustment mechanism 121 is opened. As a result, the damping force having the valve characteristic achieved by the main valve 122 is generated.

Figure 4:
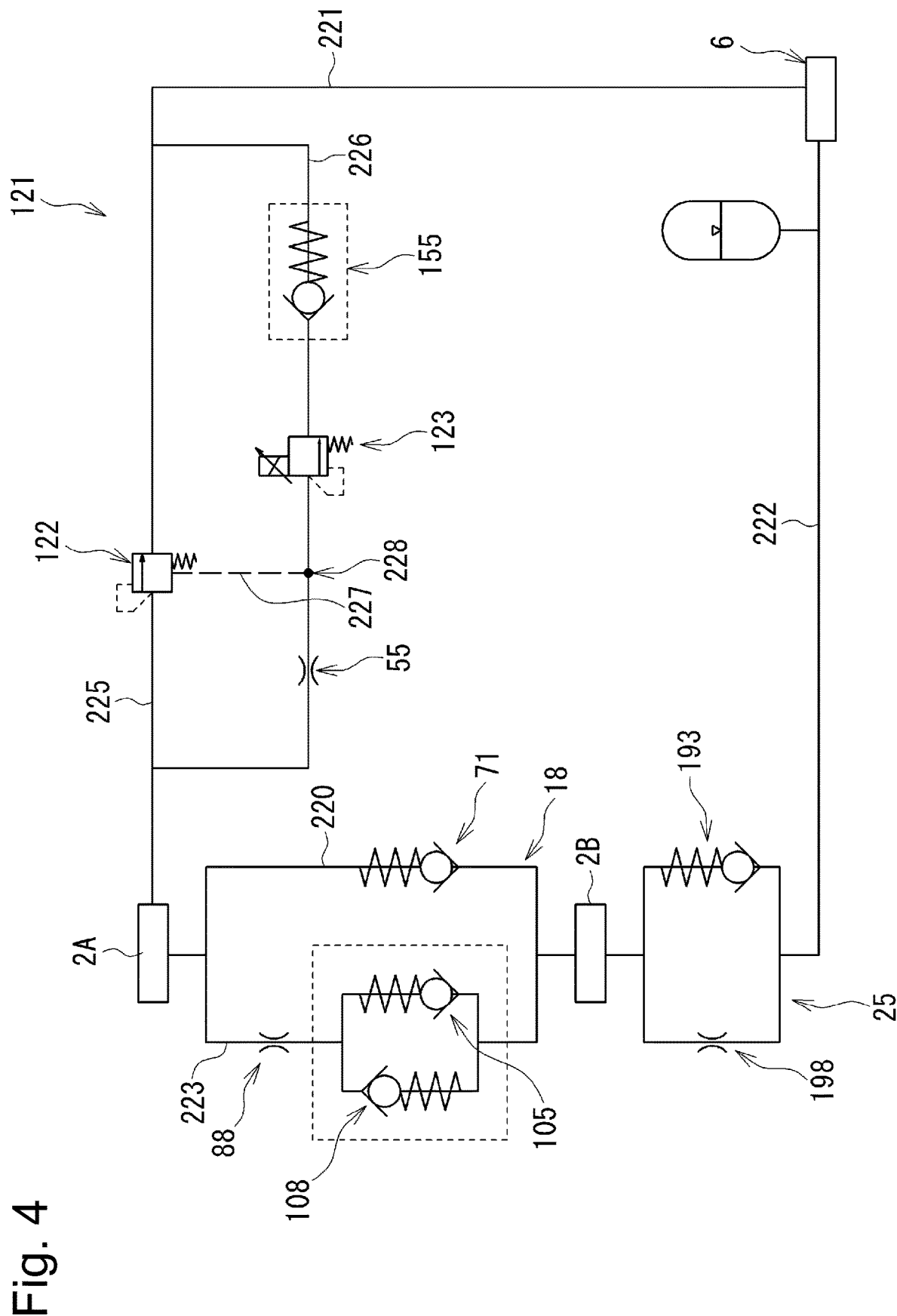
FIG. 4 is a conceptual diagram of a hydraulic circuit in the damping force adjustable shock absorber according to the first embodiment.

Here, an ultra low speed valve is provided in a piston unit of a damping force adjustment mechanism of a damping force adjustable shock absorber described in Patent Literature 2, in other words, the hydraulic circuit illustrated in FIG. 4 does not include the ultra low speed valve 155 (fourth low speed valve), that is, the ultra low speed valve 155 is eliminated from the damping force adjustment mechanism 121 of the damping force adjustable shock absorber 1. Then, when the damping force adjustable shock absorber 1 operates in the soft mode in which the pilot valve 123 (control valve) of the damping force adjustment mechanism 121 is opened, the compression-side ultra low speed valve 105 (fifth low speed valve) of the piston 18 is brought into communication with the reservoir 6 via the first passage 221 including the introduction orifice 55 of the pilot passage 226 on the upper cylinder chamber 2A (first chamber) side and is brought into communication with the reservoir 6 via the second passage 222 including the orifice 198 of the base valve 25 on the lower cylinder chamber 2B (second chamber) side.

Thus, when the piston speed falls within the ultra low speed range, the pressure on the upper cylinder chamber 2A side of the ultra low speed valve 105 is substantially the same as a pressure in the reservoir 6. Meanwhile, when the piston speed falls within the ultra low speed range, the pressure on the lower cylinder chamber 2B side of the ultra low speed valve 105 is substantially the same as the pressure in the reservoir 6. That is, when the piston speed falls within the ultra low speed range, the pressure on the upper cylinder chamber 2A side and the pressure on the lower cylinder chamber 2B side of the ultra low speed valve 105 are substantially the same. The same pressure prevents generation of a differential pressure that is sufficient to open the ultra low speed valve 105 between the upper cylinder chamber 2A side and the lower cylinder chamber 2B side of the compression-side ultra low speed valve 105. As a result, when the piston speed falls within the ultra low speed range, the damping force cannot be adjusted.

Meanwhile, in the first embodiment, the damping force adjustable shock absorber includes the intake valve 71 (first low speed valve), the compression-side disc valve 193 (second low speed valve), the first passage 221, the damping force adjustment mechanism 121, and the second passage 222. The intake valve 71 is provided in the piston 18, and allows the flow of the oil liquid from the lower cylinder chamber 2B (second chamber) toward the upper cylinder chamber 2A (first chamber). The compression-side disc valve 193 is included in the base valve 25, and allows the flow of the oil liquid from the reservoir 6 toward the lower cylinder chamber 2B (second chamber). The first passage 221 connects the upper cylinder chamber 2A (first chamber) and the reservoir 6 to each other. The damping force adjustment mechanism 121 can externally adjust the damping force from a soft characteristic corresponding to a low damping force to a hard characteristic corresponding to a high damping force by controlling the flow of the oil liquid in the first passage 221. The second passage 222 connects the reservoir 6 and the lower cylinder chamber 2B (second chamber) to each other.

Further, in the first embodiment, the damping force adjustable shock absorber includes the third passage 223 and the extension-side ultra low speed valve 108 (third low speed valve). The third passage 223 is arranged in parallel to the intake valve 71 (first low speed valve). The extension-side ultra low speed valve 108 (third low speed valve) that allows the flow of the oil liquid from the upper cylinder chamber 2A (first chamber) to the lower cylinder chamber 2B (second chamber) is provided in the third passage 223. The ultra low speed valve 108 (third low speed valve) is opened at a pressure lower than a pressure at which the intake valve 71 (first low speed valve) is opened.

Still further, in the first embodiment, the damping force adjustment mechanism 121 includes the main valve 122, the pilot chamber 115, the introduction orifice 55, the pilot passage 226, and the pilot valve 123 (control valve). The main valve 122 is opened under the pressure of the oil liquid. The pilot chamber 115 exerts the internal pressure on the main valve 122 in the valve-closing direction. The introduction orifice 55 introduces the oil liquid into the pilot chamber 115. The pilot passage 226 allows the communication among the downstream side of the introduction orifice 55, the pilot chamber 115, and the downstream side of the main valve 122. The pilot valve 123 is provided in the pilot passage 226.

Still further, the ultra low speed valve 155 (fourth low speed valve) that allows the flow of the oil liquid from the upper cylinder chamber 2A (first chamber) to the reservoir 6 is provided in the first passage 221. The piston speed at the time when the extension-side ultra low speed valve (third low speed valve) is opened is lower than the piston speed at the time when the ultra low speed valve 155 (fourth low speed valve) is opened.

According to the first embodiment, when the damping force adjustable shock absorber operates in the soft mode, the piston is performing the extension stroke, and the piston speed falls within the ultra low speed range, the communication between the upper cylinder chamber 2A (first chamber) and the reservoir 6 is interrupted by the ultra low speed valve 155 (fourth low speed valve) provided in the pilot passage 226. The interruption of the communication compresses the oil liquid in the upper cylinder chamber 2A (first chamber) when the piston is performing the extension stroke and the piston speed falls within the ultra low speed range. Thus, a differential pressure is generated between the upper cylinder chamber 2A side and the lower cylinder chamber 2B (second chamber) side of the extension-side ultra low speed valve 108 (third low speed valve). As a result, when the piston speed falls within the ultra low speed range, the extension-side ultra low speed valve 108 is opened. Thus, the damping force having the valve characteristic achieved by the ultra low speed valve 108 can be generated.

Still further, in the first embodiment, the compression-side ultra low speed valve 105 is provided in the third passage 223, and is arranged in parallel to the extension-side ultra low speed valve 108. The compression-side ultra low speed valve 105 allows the passage of the oil liquid from the lower cylinder chamber 2B (second chamber) to the upper cylinder chamber 2A (first chamber). Thus, when the damping force adjustable shock absorber operates in the soft mode, the piston is performing the compression stroke, and the piston speed falls within the ultra low speed range, the communication between the upper cylinder chamber 2A (first chamber) and the reservoir 6 is interrupted by the ultra low speed valve 155 (fourth low speed valve) provided in the pilot passage 226. The interruption of the communication enables expansion of the oil liquid in the upper cylinder chamber 2A (first chamber) when the piston is performing the compression stroke and the piston speed falls within the ultra low speed range. Thus, the differential pressure is generated between the upper cylinder chamber 2A side and the lower cylinder chamber 2B (second chamber) side of the compression-side ultra low speed valve 105 (fifth low speed valve). As a result, when the piston speed falls within the ultra low speed range, the compression-side ultra low speed valve 105 is opened. Thus, the damping force having the valve characteristic achieved by the ultra low speed valve 105 can be generated.

(Second Embodiment) Next, a second embodiment is described with reference to FIG. 6 and FIG. 7. Here, differences from the first embodiment are described. The same names and reference symbols are used for parts common to the first embodiment, and an overlapping description thereof is omitted.

Figure 6:
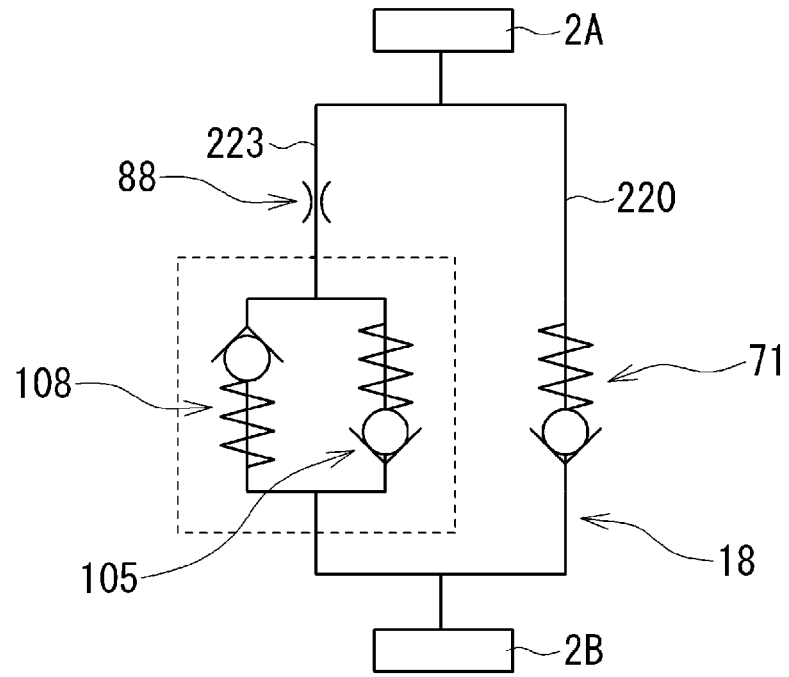
FIG. 6 is a conceptual diagram of a hydraulic circuit in the piston of the damping force adjustable shock absorber according to the first embodiment.

In the first embodiment, as illustrated in FIG. 6, the piston 18 includes the third passage 223 arranged in parallel to the intake valve 71 (first low speed valve). The extension-side ultra low speed valve 108 (third low speed valve) and the compression-side ultra low speed valve 105 (fifth low speed valve) are arranged in parallel in the third passage 223. The ultra low speed valves 108 and 105 are arranged closer to the low cylinder chamber 2B (second chamber) with respect to the orifice 88 provided in the third passage 223. The orifice 88 allows the communication between the upper cylinder chamber 2A (first chamber) and the lower cylinder chamber 2B (second chamber).

Figure 7:
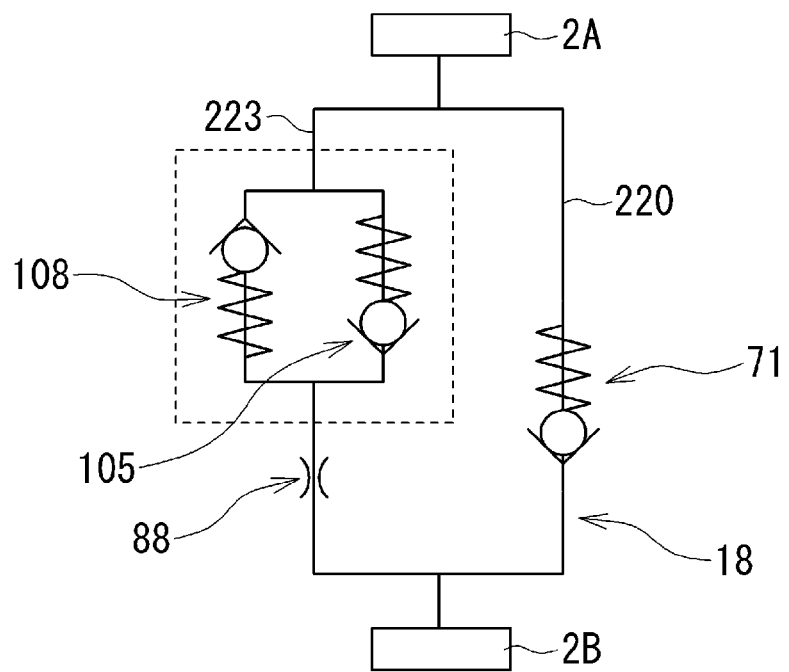
FIG. 7 is a conceptual diagram of a hydraulic circuit in a piston of a damping force adjustable shock absorber according to a second embodiment.

Meanwhile, in the second embodiment, as illustrated in FIG. 7, ultra low speed valves 108 and 105 are arranged closer to an upper cylinder chamber 2A (first chamber) with respect to an orifice 88.

The same actions and effects as those achieved in the above-mentioned first embodiment can be obtained in the second embodiment.

(Third Embodiment) Next, a third embodiment is described with reference to FIG. 6 and FIG. 8. Here, differences from the first embodiment are described. The same names and reference symbols are used for parts common to the first embodiment, and an overlapping description thereof is omitted.

In the first embodiment, as illustrated in FIG. 6, the piston 18 includes the third passage 223 arranged in parallel to the intake valve 71 (first low speed valve). The extension-side ultra low speed valve 108 (third low speed valve) and the compression-side ultra low speed valve 105 (fifth low speed valve) are arranged in parallel in the third passage 223. The ultra low speed valves 108 and 105 are arranged closer to the low cylinder chamber 2B (second chamber) with respect to the orifice 88 provided in the third passage 223. The orifice 88 allows the communication between the upper cylinder chamber 2A (first chamber) and the lower cylinder chamber 2B (second chamber).

Figure 8:
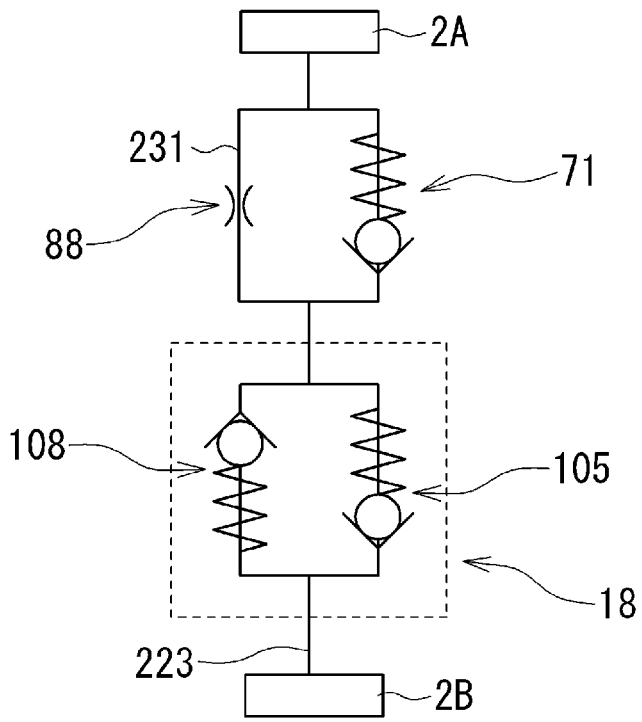
FIG. 8 is a conceptual diagram of a hydraulic circuit in a piston of a damping force adjustable shock absorber according to a third embodiment.

Meanwhile, in the third embodiment, as illustrated in FIG. 8, a piston 18 includes a third passage 223 arranged in series to an intake valve 71 (first low speed valve). An extension-side ultra low speed valve 108 (third low speed valve) and a compression-side ultra low speed valve 105 (fifth low speed valve) are arranged in parallel in the third passage 223. Further, in the third embodiment, the third passage 223 is arranged closer to a lower cylinder chamber 2B (second chamber) with respect to the intake valve 71. Further, in the third embodiment, the piston 18 includes a sixth passage 231 arranged in parallel to the intake valve 71 (first low speed valve). An orifice 88 that allows communication between an upper cylinder chamber 2A (first chamber) and the lower cylinder chamber 2B (second chamber) is provided in the sixth passage 231.

In the third embodiment, the extension-side ultra low speed valve 108 and the compression-side ultra low speed valve 105 are arranged closer to the lower cylinder chamber 2B (second chamber) with respect to the intake valve 71 and the orifice 88.

The same actions and effects as those achieved in the above-mentioned first embodiment can be obtained in the third embodiment.

(Fourth Embodiment) Next, a fourth embodiment is described with reference to FIG. 8 and FIG. 9. Here, differences from the third embodiment are described. The same names and reference symbols are used for parts common to the third embodiment, and an overlapping description thereof is omitted.

In the third embodiment, as illustrated in FIG. 8, the piston 18 includes the third passage 223 arranged in series to the intake valve 71 (first low speed valve). The extension-side ultra low speed valve 108 (third low speed valve) and the compression-side ultra low speed valve 105 (fifth low speed valve) are arranged in parallel in the third passage 223. Further, in the third embodiment, the third passage 223 is arranged closer to the lower cylinder chamber 2B (second chamber) with respect to the intake valve 71. Further, in the third embodiment, the piston 18 includes the sixth passage 231 arranged in parallel to the intake valve 71 (first low speed valve). The orifice 88 that allows communication between the upper cylinder chamber 2A (first chamber) and the lower cylinder chamber 2B (second chamber) is provided in the sixth passage 231.

Figure 9:
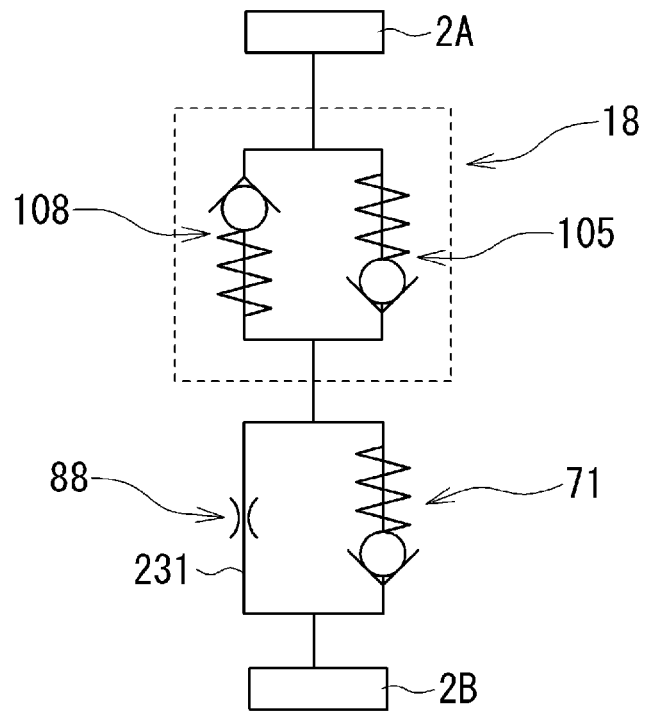
FIG. 9 is a conceptual diagram of a hydraulic circuit in a piston of a damping force adjustable shock absorber according to a fourth embodiment.

Meanwhile, in the fourth embodiment, as illustrated in FIG. 9, a third passage 223 is arranged closer to an upper cylinder chamber 2A (first chamber) with respect to an intake valve 71.

The same actions and effects as those achieved in the above-mentioned first embodiment can be obtained in the fourth embodiment.

(Fifth Embodiment) Next, a fifth embodiment is described with reference to FIG. 10 and FIG. 11. Here, differences from the first embodiment are described. The same names and reference symbols are used for parts common to the first embodiment, and an overlapping description thereof is omitted.

Figure 10:
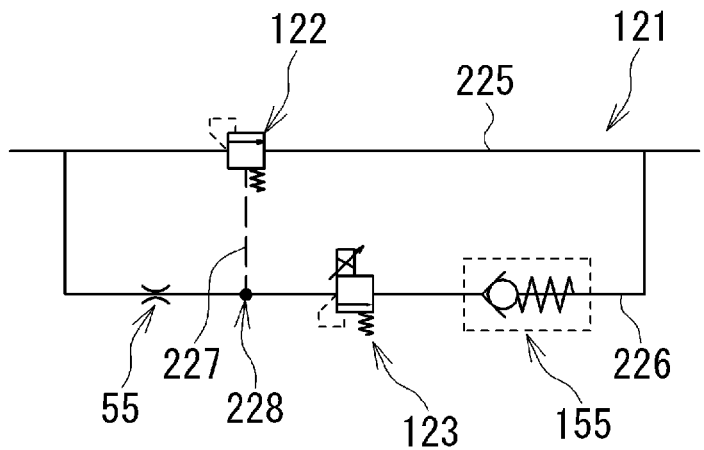
FIG. 10 is a conceptual diagram of a hydraulic circuit in a damping force adjustment mechanism of the damping force adjustable shock absorber according to the first embodiment.

In the first embodiment, as illustrated in FIG. 10, the ultra low speed valve 155 (fourth low speed valve) that allows the flow of the oil liquid from the upper cylinder chamber 2A (first chamber) to the reservoir 6 is provided in the pilot passage 226. The ultra low speed valve 155 is arranged closer to the reservoir 6 with respect to the pilot valve 123.

Figure 11:
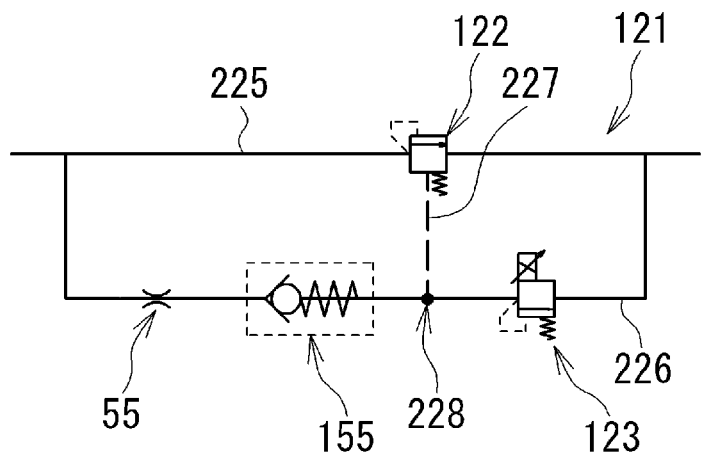
FIG. 11 is a conceptual diagram of a hydraulic circuit in a damping force adjustment mechanism of a damping force adjustable shock absorber according to a fifth embodiment.

Meanwhile, in the fifth embodiment, as illustrated in FIG. 11, an ultra low speed valve 155 (fourth low speed valve) is provided in a pilot passage 226, and is arranged between a connecting portion 228 and an introduction orifice 55. The pilot passage 226 and a communication path 227 are connected at the connecting portion 228.

The same actions and effects as those achieved in the above-mentioned first embodiment can be obtained in the fifth embodiment.

(Sixth Embodiment) Next, a sixth embodiment is described with reference to FIG. 10 and FIG. 12. Here, differences from the first embodiment are described. The same names and reference symbols are used for parts common to the first embodiment, and an overlapping description thereof is omitted.

In the first embodiment, as illustrated in FIG. 10, the ultra low speed valve 155 (fourth low speed valve) that allows the flow of the oil liquid from the upper cylinder chamber 2A (first chamber) to the reservoir 6 is provided in the pilot passage 226. The ultra low speed valve 155 is arranged closer to the reservoir 6 with respect to the pilot valve 123.

Figure 12:
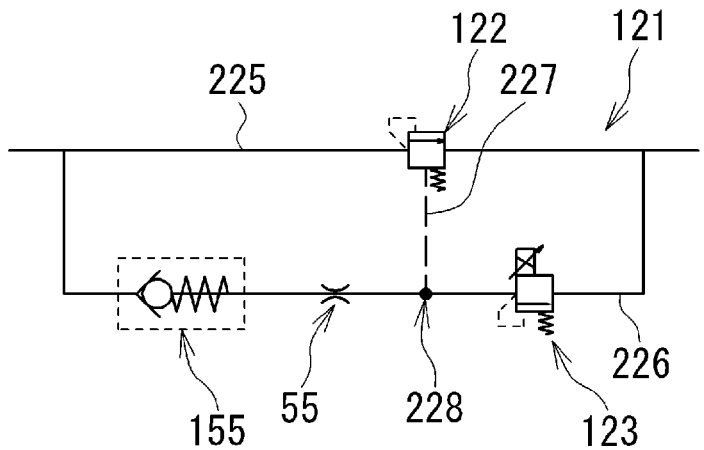
FIG. 12 is a conceptual diagram of a hydraulic circuit in a damping force adjustment mechanism of a damping force adjustable shock absorber according to a sixth embodiment.

Meanwhile, in the sixth embodiment, as illustrated in FIG. 12, an ultra low speed valve 155 (fourth low speed valve) is provided in a pilot passage 226, and is arranged closer to an upper cylinder chamber 2A (first chamber) with respect to an introduction orifice 55.

The same actions and effects as those achieved in the above-mentioned first embodiment can be obtained in the sixth embodiment.

(Seventh Embodiment) Next, a seventh embodiment is described with reference to FIG. 10 and FIG. 13. Here, differences from the first embodiment are described. The same names and reference symbols are used for parts common to the first embodiment, and an overlapping description thereof is omitted.

In the first embodiment, as illustrated in FIG. 10, the ultra low speed valve 155 (fourth low speed valve) that allows the flow of the oil liquid from the upper cylinder chamber 2A (first chamber) to the reservoir 6 is provided in the pilot passage 226. The ultra low speed valve 155 is arranged closer to the reservoir 6 with respect to the pilot valve 123.

Figure 13:
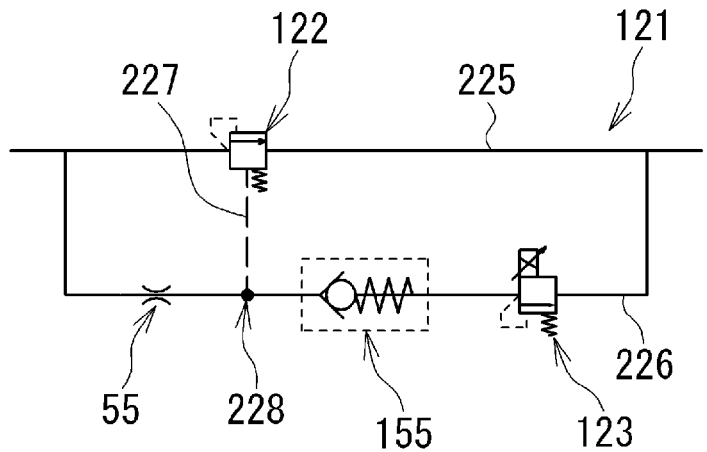
FIG. 13 is a conceptual diagram of a hydraulic circuit in a damping force adjustment mechanism of a damping force adjustable shock absorber according to a seventh embodiment.

Meanwhile, in the seventh embodiment, as illustrated in FIG. 13, an ultra low speed valve 155 (fourth low speed valve) is provided in a pilot passage 226, and is arranged between a connecting portion 228 and a pilot valve 123.

The same actions and effects as those achieved in the above-mentioned first embodiment can be obtained in the seventh embodiment.

(Eighth Embodiment) Next, an eighth embodiment is described with reference to FIG. 10 and FIG. 14. Here, differences from the first embodiment are described. The same names and reference symbols are used for parts common to the first embodiment, and an overlapping description thereof is omitted.

In the first embodiment, as illustrated in FIG. 10, the ultra low speed valve 155 (fourth low speed valve) that allows the flow of the oil liquid from the upper cylinder chamber 2A (first chamber) to the reservoir 6 is provided in the pilot passage 226 (pilot flow path).

Figure 14:
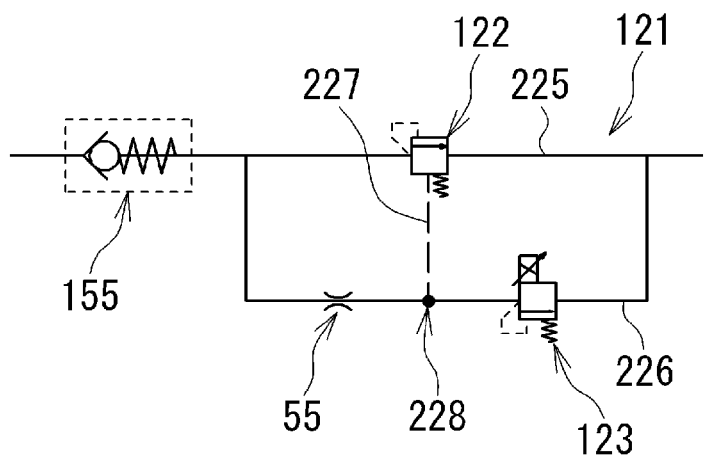
FIG. 14 is a conceptual diagram of a hydraulic circuit in a damping force adjustment mechanism of a damping force adjustable shock absorber according to an eighth embodiment.

Meanwhile, in the eighth embodiment, as illustrated in FIG. 14, an ultra low speed valve 155 (fourth low speed valve) is arranged closer to an upper cylinder chamber 2A (first chamber) with respect to a pilot passage 226 (pilot flow path).

The same actions and effects as those achieved in the above-mentioned first embodiment can be obtained in the eighth embodiment.

(Ninth Embodiment) Next, a ninth embodiment is described with reference to FIG. 10 and FIG. 15. Here, differences from the first embodiment are described. The same names and reference symbols are used for parts common to the first embodiment, and an overlapping description thereof is omitted.

In the first embodiment, as illustrated in FIG. 10, the ultra low speed valve 155 (fourth low speed valve) that allows the flow of the oil liquid from the upper cylinder chamber 2A (first chamber) to the reservoir 6 is provided in the pilot passage 226 (pilot flow path).

Figure 15:
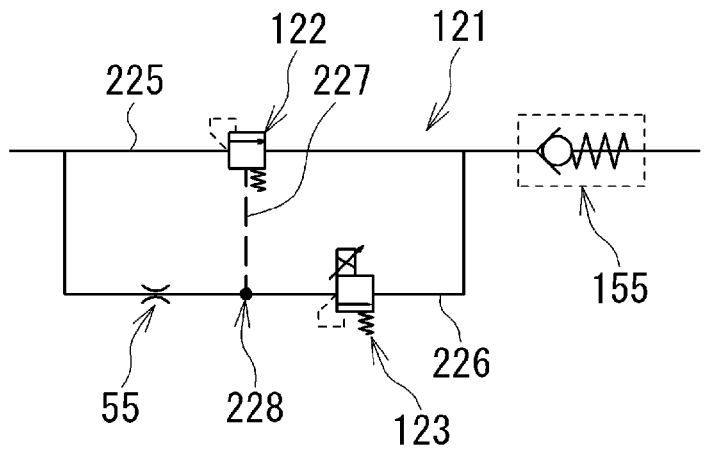
FIG. 15 is a conceptual diagram of a hydraulic circuit in a damping force adjustment mechanism of a damping force adjustable shock absorber according to a ninth embodiment.

Meanwhile, in the ninth embodiment, as illustrated in FIG. 15, an ultra low speed valve 155 (fourth low speed valve) is arranged closer to a reservoir 6 with respect to a pilot passage 226 (pilot flow path).

The same actions and effects as those achieved in the above-mentioned first embodiment can be obtained in the ninth embodiment.

(Tenth Embodiment) Next, a tenth embodiment is described with reference to FIG. 16. Here, differences from the first embodiment are described. The same names and reference symbols are used for parts common to the first embodiment, and an overlapping description thereof is omitted.

Figure 16:
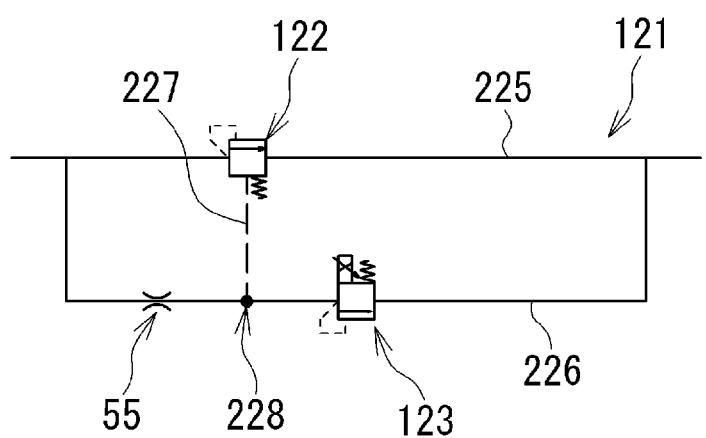
FIG. 16 is a conceptual diagram of a hydraulic circuit in a damping force adjustment mechanism of a damping force adjustable shock absorber according to a tenth embodiment.

In the tenth embodiment, as illustrated in FIG. 16, a pilot valve 123 also serves as an ultra low speed valve 155. In this case, the pilot valve 123 is normally closed. When a current for a soft characteristic flows, the pilot valve 123 is seated on a seat portion 169. When such a pilot valve is used, the pilot valve is closed until ultra low speed valves 105 and 108 of a piston 18 are opened. As a result, a damping force having a valve characteristic achieved by the ultra low speed valves 105 and 108 is generated in an initial stage. After that, the pilot valve is opened. That is, in the tenth embodiment, the pilot valve 123 corresponding to a control valve may also serve as the ultra low speed valve 155 corresponding to a fourth low speed valve.

The same actions and effects as those achieved in the above-mentioned first embodiment can be obtained in the tenth embodiment.

In the first to tenth embodiments described above, description has been given of the case in which the piston speeds at the time when the ultra low speed valve 105 (fifth low speed valve) is opened and at the time when the ultra low speed valve 108 (third low speed valve) is opened are lower than the piston speed at the time when the ultra low speed valve 155 (fourth low speed valve) is opened.

However, a relationship between the piston speeds may be interchanged. That is, the piston speeds at the time when the ultra low speed valve 105 (fifth low speed valve) is opened and the time at which the ultra low speed valve 108 (third low speed valve) is opened may be set higher than the piston speed at the time when the ultra low speed valve 155 (fourth low speed valve) is opened.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-105461 filed on Jun. 5, 2019. All disclosed contents including Specification, Scope of Claims, Drawings, and Abstract of Japanese Patent Application No. 2019-105461 filed on Jun. 5, 2019 are incorporated herein by reference in their entirety.

REFERENCE SIGNS LIST

1 damping force adjustable shock absorber, 2 cylinder, 2A upper cylinder chamber (first chamber), 2B lower cylinder chamber 2B (second chamber), 6 reservoir, 18 piston, 21 piston rod, 25 base valve, 55 introduction orifice, 71 intake valve (first low speed valve), 108 ultra low speed valve (third low speed valve), 115 pilot chamber, 121 damping force adjustment mechanism, 122 main valve, 123 pilot valve (control valve), 155 ultra low speed valve (fourth low speed valve), 193 ultra low speed valve (second low speed valve), 221 first passage, 222 second passage, 223 third passage, 226 pilot passage

The invention claimed is:

1. A damping force adjustable shock absorber, comprising:
a cylinder sealingly enclosing a working liquid;
a reservoir sealingly enclosing the working liquid and a gas;
a piston, which is slidably fitted into the cylinder, and separates a space inside the cylinder into a first chamber and a second chamber;
a piston rod having one end coupled to the piston and another end extending to an outside through the first chamber;
a base valve separating the second chamber and the reservoir from each other;
a first low speed valve, which is provided in the piston, and is configured to allow a flow of the working liquid from the second chamber toward the first chamber;
a second low speed valve, which is provided in the base valve, and is configured to allow a flow of the working liquid from the reservoir toward the second chamber;
a first passage connecting the first chamber and the reservoir to each other;
a damping force adjustment mechanism capable of adjusting a damping force from a soft characteristic corresponding to a low damping force to a hard characteristic corresponding to a high damping force in accordance with an external command by controlling a flow of the working liquid in the first passage;
a second passage connecting the reservoir and the second chamber;
a third passage arranged in parallel or in series to the first low speed valve; and
a third low speed valve, which is provided in the third passage, and is configured to allow a flow of the working liquid from the first chamber to the second chamber, the third low speed valve being opened at a pressure lower than a pressure at which the first low speed valve is opened,
wherein the damping force adjustment mechanism includes:
a main valve to be opened under a pressure of the working liquid;
a pilot chamber configured to exert an internal pressure on the main valve in a valve-closing direction;
an introduction orifice configured to introduce the working liquid into the pilot chamber;
a pilot passage configured to allow communication between a downstream side of the introduction orifice and the pilot chamber and a downstream side of the main valve; and
a control valve provided in the pilot passage; and
a fail-safe valve provided on a downstream side of the control valve,
wherein the control valve, the fail-safe valve, and a fourth low speed valve, which are configured to allow a flow of the working liquid from the first chamber to the reservoir, is provided in the first passage, and
wherein a piston speed at which the third low speed valve is opened is different from a piston speed at which the fourth low speed valve is opened.

2. The damping force adjustable shock absorber according to claim 1, wherein the fourth low speed valve is provided in the pilot passage.

3. The damping force adjustable shock absorber according to claim 1, further comprising a fifth low speed valve, which is provided in the third passage, and is configured to allow the flow of the working liquid from the second chamber to the first chamber.

4. The damping force adjustable shock absorber according to claim 3,
wherein the third passage is arranged in parallel to the first low speed valve,
wherein the third low speed valve and the fifth low speed valve are arranged in parallel in the third passage, and
wherein an orifice that allows communication between the first chamber and the second chamber is provided in the third passage included in the piston, and is arranged closer to the first chamber or the second chamber with respect to the third low speed valve and the fifth low speed valve.

5. The damping force adjustable shock absorber according to claim 3,
wherein the third passage is arranged in series to the first low speed valve, wherein the third low speed valve and the fifth low speed valve are arranged in parallel in the third passage, wherein a sixth passage is arranged in parallel to the first low speed valve, wherein an orifice that allows communication between the first chamber and the second chamber is provided in the sixth passage, and wherein the third low speed valve and the fifth low speed valve are arranged closer to the first chamber or the second chamber with respect to the first low speed valve and the orifice.

6. The damping force adjustable shock absorber according to claim 1, wherein the damping force adjustment mechanism includes a communication path that allows communication between the main valve and the pilot passage, wherein the introduction orifice is arranged at a position in the pilot passage, which is closer to the first chamber with respect to a connecting portion between the communication path and the pilot passage, wherein the control valve and the fourth low speed valve are arranged at positions in the pilot passage, which are closer to the reservoir with respect to the connecting portion, and wherein the fourth low speed valve is arranged closer to the reservoir with respect to the control valve.

7. The damping force adjustable shock absorber according to claim 1, wherein the damping force adjustment mechanism includes a communication path that allows communication between the main valve and the pilot passage, wherein the introduction orifice is arranged at a position in the pilot passage, which is closer to the first chamber with respect to a connecting portion between the communication path and the pilot passage, wherein the control valve and the fourth low speed valve are arranged at positions in the pilot passage, which are closer to the reservoir with respect to the connecting portion, and wherein the fourth low speed valve is arranged between the introduction orifice and the connecting portion.

8. The damping force adjustable shock absorber according to claim 1, wherein the damping force adjustment mechanism includes a communication path that allows communication between the main valve and the pilot passage, wherein the introduction orifice is arranged at a position in the pilot passage, which is closer to the first chamber with respect to a connecting portion between the communication path and the pilot passage, wherein the control valve and the fourth low speed valve are arranged at positions in the pilot passage, which are closer to the reservoir with respect to the connecting portion, and wherein the fourth low speed valve is arranged closer to the first chamber with respect to the introduction orifice.

9. The damping force adjustable shock absorber according to claim 1, wherein the damping force adjustment mechanism includes a communication path that allows communication between the main valve and the pilot passage, wherein the introduction orifice is arranged at a position in the pilot passage, which is closer to the first chamber with respect to a connecting portion between the communication path and the pilot passage, wherein the control valve and the fourth low speed valve are arranged at positions in the pilot passage, which are closer to the reservoir with respect to the connecting portion, and wherein the fourth low speed valve is arranged between the connecting portion and the control valve.

10. The damping force adjustable shock absorber according to claim 1, wherein the fourth low speed valve is arranged closer to the first chamber or the second chamber with respect to the pilot passage.

* * * * *